July 11, 1961

E. E. LITTLEFIELD 2,991,799

FLUID MOTOR CONTROL VALVE

Original Filed Nov. 4, 1944

INVENTOR
EDGAR E. LITTLEFIELD

BY *Henry B. Stauffer*
ATTORNEY

United States Patent Office 2,991,799
Patented July 11, 1961

2,991,799
FLUID MOTOR CONTROL VALVE
Edgar E. Littlefield, 834 N. Stanley Ave., West Hollywood, Los Angeles, Calif.; Effie Dora Jones Littlefield, executrix of said Edgar E. Littlefield, deceased
Original application Nov. 4, 1944, Ser. No. 562,002, now Patent No. 2,657,673, dated Nov. 3, 1953. Divided and this application Sept. 17, 1953, Ser. No. 380,707
9 Claims. (Cl. 137—595)

This application contains subject matter common to my copending application Number 465,994, filed November 18, 1942, now Patent 2,496,553, and to that extent is a continuation-in-part of the earlier application. It is a division or restriction of my prior application Ser. No. 562,002, now Patent No. 2,657,673.

The invention relates to improvements in valves and control systems, and has particular reference to fluid pressure operated valves and valve systems.

The invention further relates to fluid pressure operated valves suitable for controlling the supply and exhaust for a cylinder having a piston therein to be reciprocated and to drive a suitable element.

An object of the invention is to provide a common control for pressure operated valves, as well as for valves of other types, controlling the supply and exhaust for a working piston.

The invention also relates to fluid pressure operated valves each having a pilot valve to control the operation thereof, and the invention has for an object to provide a common electrical control for operating the pilot valves, in such manner that one of the main valves may remain closed while the other thereof is open.

Another object of the invention is to employ the pilot valve principle for the double function of controlling the exhaust and the supply for the fluid pressure operated member of a power controlling cylinder.

Another object of the invention is to provide a compact unitary assembly of main supply and exhaust valves and common actuating means therefor.

Another object is to improve the construction and operation of fast opening valves, slow closing valves, fluid pressure operated valves and electrically operated or controlled valves of various types.

Other objects and many of the attendant advantages of this invention will be readily appreciated as the same becomes better understood by reference to the following detailed description when considered in connection with the accompanying drawings, wherein.

Figure 1:
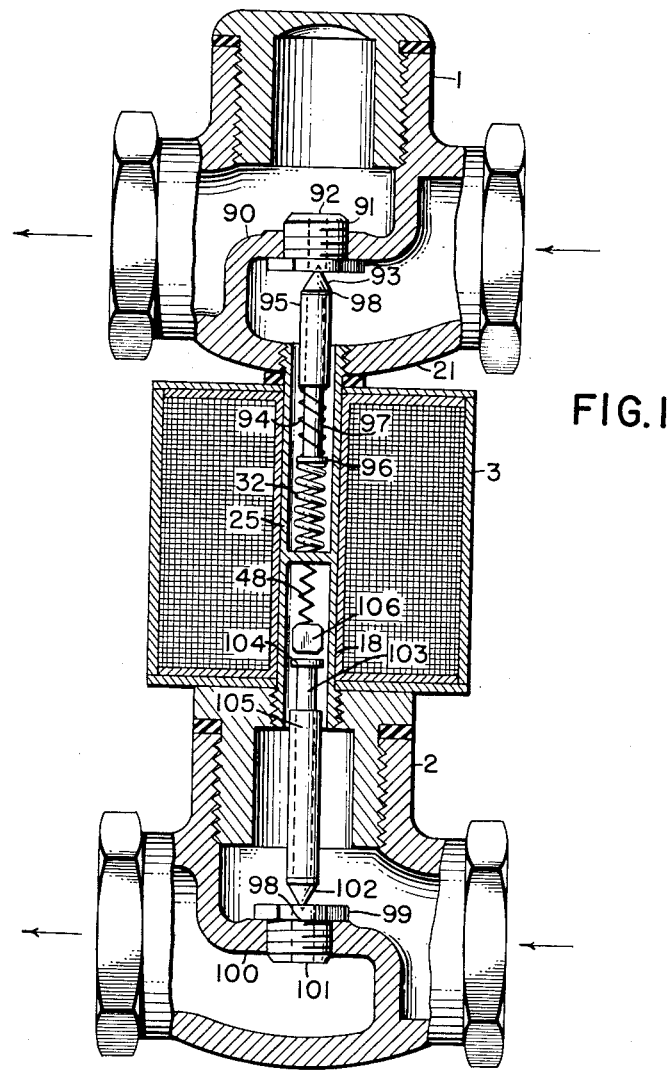
FIGURE 1 is an elevation, partly in section, of the valve of my invention.

Referring now to the drawings and especially to FIG. 1 thereof, my valve is shown housed in a structure of conventional conformation. Should additional information be desired on conventional features hereof, reference may be had to my Patent No. 2,657,673, above referred to.

In the port wall 90 I have screw threaded a plug 91 having a passage 92 therethrough, the lower end of which forms a seat for a needle valve 93. Slidable on the non-magnetic stem 94 of the needle valve is a magnetizable sleeve 95 constituting an armature. The lower end of the member 94 is provided with a cap 96 and between this cap and the lower end of sleeve 95 a compression spring 97 acts to urge the sleeve to assume a position against the shoulder 98 of the needle valve 93. The needle valve itself is urged to a seated position by the compression spring 32 mounted between the wall 25 and the cap or head 96 of the needle valve stem. The sleeve 95 is preferably made of stainless iron or its equivalent. The pointed end of the needle valve may, if desired, be made of stainless iron and mounted on the non-magnetic stem 94 in any convenient manner. The cap or head 96, also, may be made of stainless iron and mounted on the stem 94 in any convenient manner.

The lower valve housing 2 is provided with a plug 99, similar to the one of the upper valve, screw threaded into the port wall 100. Like the former, this plug is also provided with a passage 101. The upper end of this passage forms a seat for a needle valve 102 having a non-magnetizable stem 103 provided with a head 104. Slidable on the stem 103 is an armature preferably made of stainless iron or its equivalent. If desired, a compression spring, such as 97, may be interposed between the sleeve 105 and the cap or head 104. The stem 103, together with the cap 104 and needle valve and, may be made of brass or similar material, or the cap or valve end made of stainless iron, or its equivalent, all as desired, to meet the requirements of any particular purpose. Between the wall 25 and the upper end of the valve stem is inserted a compression spring, such as 48, the lower end of which rests on a magnetizable plug 106 which, in turn, rests on the top of cap 104. In certain cases the use of this plug 106 would be optional. The plugs 91 and 99 may be identical in every respect and may, on occasions, if desired, be provided with fluid flow regulating so that the flow through either or both of the passages through the plugs may be regulated. In this connection it may be desirable to have the exhaust passage, assuming for example that the valve's connection is to a power cylinder, of greater capacity than the one handling the supply. I contemplate that the valve assemblies in both the upper and lower chambers, i.e., the chambers above and below the walls 25, may be indentical in every respect, or interchangeable, one for the other. For instance, the valve 93 and its co-operating parts may be substituted for the valve 102 and its co-operating parts or vice versa. Such an arrangement enables the units to be made in pairs, thus, in many cases, reducing manufacturing costs.

When solenoid 3 is energized the valves 93 and 102 are unseated and retracted toward the wall 25, permitting fluid to flow through the discharge passages 92 and 101, of the plugs 91 and 99. Upon de-energizing solenoid 3 the valves again assume a closed position, as indicated in the drawing.

Figure 2:
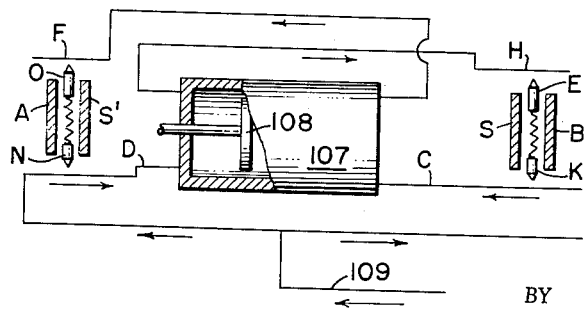
FIGURE 2 is a diagrammatic showing of a control system employing features of the aforementioned valve.

In FIG. 2 I have shown a diagram of connections in which two valves of the above type, or similar (shown in conventional form) are connected to control the supply and exhaust for a power cylinder 107, having a piston 108, which may be connected in any convenient manner for operating any suitable mechanism. Supply pipes c and d connect the cylinder at each end with a source of fluid under pressure 109. Exhaust pipes f and h connected to the cylinder as shown permit fluid at times to exhaust from the cylinder. The valve assembly B, as shown, is connected so that its valve member k may control the supply of fluid to the cylinder, at one end, and the valve member m connected so that it may control the exhaust from the opposite end of the cylinder. The valve assembly A is connected in a similar manner to the upper end of the cylinder, or so that its valve member n may control the supply of fluid to the upper end of the cylinder and the valve member O so that it may control the exhaust from the lower end of the cylinder. If solenoid s is now energized, fluid under pressure will enter the cylinder through branch pipe c, causing piston 108 to move upwardly, tending to force fluid from the cylinder through exhaust pipe h. Since the energization of solenoid S has unseated both valve members m and k fluid will exhaust from the cylinder as indicated. If solenoid S is now de-energized and solenoid S′ energized fluid under pressure will enter the cylinder through branch pipe d, causing the piston 108 to move downwardly, tending to force fluid from the cylinder at the opposite, or lower end, and since the energization of this solenoid has also unseated valve member O, fluid will exhaust through the latter.

Re-arrangements in the elements shown and described may be made for carrying out any particular or desired purpose.

For the sake of clearness and brevity I have illustrated only a few simple embodiments of my invention and the several features thereof, and have described them with particularity; but it will of course be understood that my invention is not limited to the forms thus illustrated, as I intend to cover all forms, methods, and arrangements that come within the definitions of my invention as set forth in the appended claims.

I claim:

1. A valve assembly including; valve housings comprising a tubular core member having a spacer between the housings; a normally closed poppet valve for each housing; magnetizable means associated with each valve and movable at times simultaneously toward said spacer; and electrical controlling means common to said magnetizable means.

2. A valve assembly including; tubular valve housings; a spacer between the housings; a normally closed poppet valve within each housing; magnetizable means associated with each valve and movable at times toward said spacer; yieldable means tending to maintain said valves in closed position; and electrical means for overcoming said yieldable means.

3. A valve assembly including tubular valve housings terminating at one end in a common fluid tight wall; magnetizable means within said housings movable at times simultaneously toward said wall; poppet valves associated with said magnetizable means, and controlled by the latter; yieldable means tending to maintain said valves in closed position; and electrical means for overcoming said yieldable means.

4. A valve assembly including valve housings; a spacer between the housings; a normally closed poppet valve within each housing; valve controlling magnetizable means associated with each valve and movable simultaneously toward said spacer; yieldable means tending to maintain said valves in closed position; and electrical means for overcoming said yieldable means.

5. A valve assembly including tubular valve housings; a spacer between the housings; a pair of valves within said housings which open and/or close simultaneously by movement in opposite directions; magnetizable means associated with said valves and controlling the same; yieldable means tending to normally maintain said valves in one of said positions; and electrical means for overcoming said yieldable means.

6. A valve assembly including tubular valve housings; a spacer between the housings; valve seats spaced from the spacer and with their seating areas substantially facing the spacer; poppet valves co-operating with said seats; magnetizable means within said housings associated with said valves and controlling the same; yieldable means co-operating with said magnetizable means tending to maintain said valves in closed position; and electrical means for overcoming said yieldable means.

7. A valve assembly including valve housings having a common axis and separated from each other by a dividing wall; magnetizable means within said housings movable simultaneously toward said wall; poppet valves formed by said magnetizable means; yieldable means tending to maintain said valves in closed position; and electrical means for overcoming said yieldable means.

8. A valve assembly including valve housings; a spacer between the housings; magnetizable means within said housings movable at times simultaneously toward said spacer; valves associated with said magnetizable means and controlled by the latter; valve seats normally occupied by said valves; electrical means controlling said magnetizable means.

9. A valve structure including, in combination; a solenoid having a tubular core member divided into chambers by a fluid tight wall; magnetizable means movable toward said wall when energized; valves controlled by said magnetizable means; ports controlled by said valves; electrical controlling means common to said magnetizable means.

References Cited in the file of this patent

UNITED STATES PATENTS

| | | |
|---|---|---|
| 294,669 | Pope | Mar. 4, 1884 |
| 604,358 | Alexander | May 24, 1898 |
| 1,284,197 | Larner | Nov. 5, 1918 |
| 1,515,673 | Geissinger | Nov. 18, 1924 |
| 2,096,763 | Ray | Oct. 26, 1937 |
| 2,322,911 | Beam | June 29, 1943 |
| 2,343,806 | Scofield | Mar. 7, 1944 |
| 2,657,673 | Littlefield | Nov. 3, 1953 |